Figure 1:
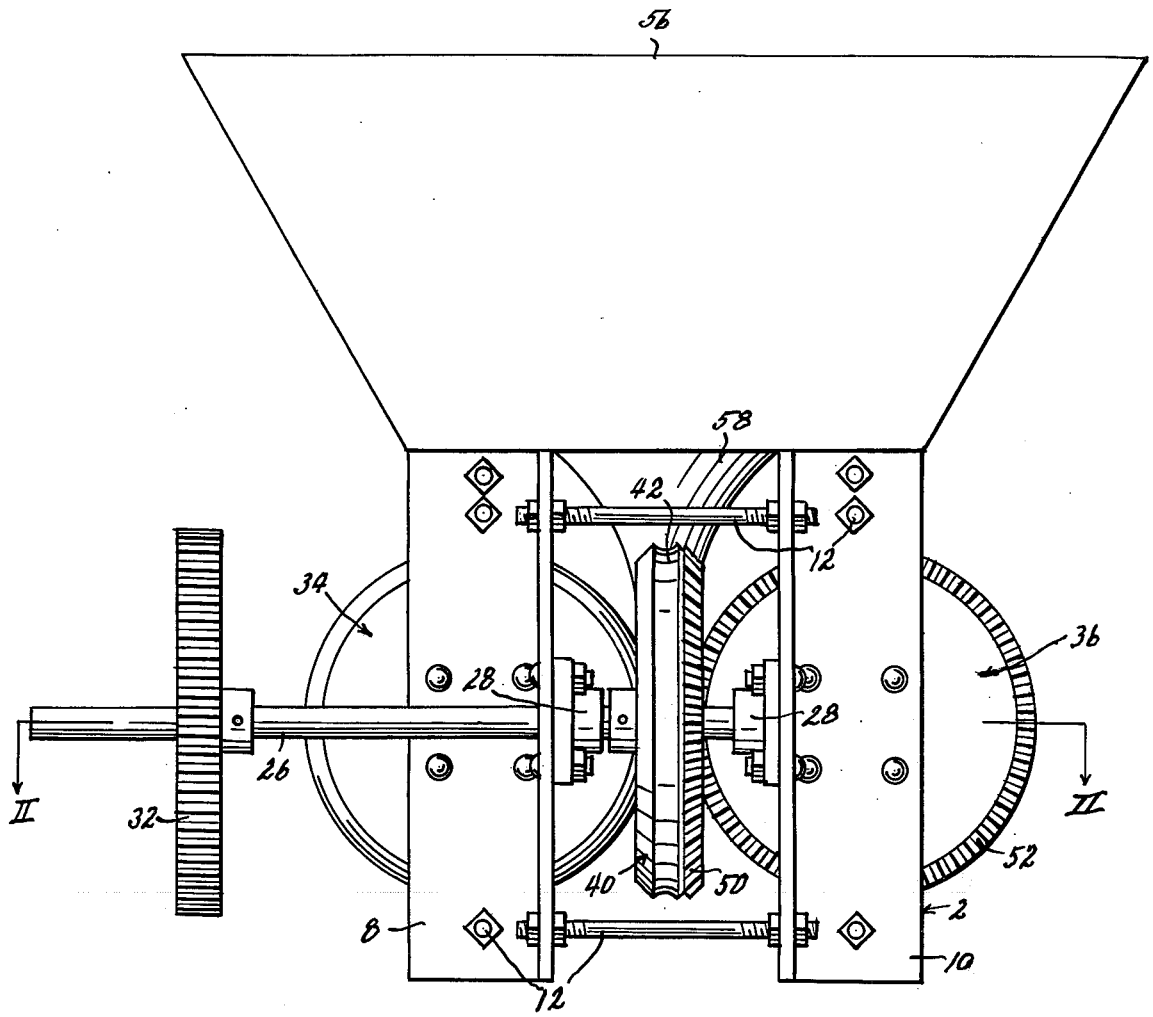

United States Patent [19]
Packwood

[11] 4,073,032
[45] Feb. 14, 1978

[54] NUT CRACKING MACHINE

[76] Inventor: Ralph V. Packwood, Box 203, Exeter, Mo. 65647

[21] Appl. No.: 744,522

[22] Filed: Nov. 24, 1976

[51] Int. Cl.² ............................................. A23N 5/00
[52] U.S. Cl. .................................................... 99/574
[58] Field of Search ................. 99/574, 567, 568, 556; 241/227, 235; 425/329, 366; 164/277; 100/158 R

[56] References Cited

U.S. PATENT DOCUMENTS

| | | | |
|---|---|---|---|
| 1,175,318 | 3/1916 | Stewart | 99/574 X |
| 2,094,083 | 9/1937 | Rey | 241/235 X |
| 2,230,790 | 2/1941 | Anderson | 99/574 |
| 3,048,892 | 8/1962 | Davis, Jr. et al. | 425/329 X |
| 3,825,393 | 7/1974 | Bittner et al. | 425/329 X |

FOREIGN PATENT DOCUMENTS

| | | | |
|---|---|---|---|
| 378,417 | 8/1907 | France | 99/556 |
| 1,319,240 | 6/1973 | United Kingdom | 425/329 |

*Primary Examiner*—Edward L. Roberts
*Attorney, Agent, or Firm*—John A. Hamilton

[57] ABSTRACT

A nut cracking machine comprising a plurality of wheels rotatable by a power drive on axes forming a closed, planar polygon, the peripheries of the wheels meeting at the center of the polygon, peripheral grooves of arcuate cross-sectional form in the peripheries of the wheels conjointly forming a circular orifice between the wheels in the plane of the polygon, through which nuts to be cracked are passed.

1 Claim, 3 Drawing Figures

NUT CRACKING MACHINE

This invention relates to new and useful improvements in machines for cracking nuts, and has particular reference to a machine for cracking black walnuts, although it will be apparent that the machine may be utilized for cracking other species of nuts if so desired.

The principal object of the present invention is the provision of a machine for cracking black walnuts in such a manner as to produce a greater proportion of large-size pieces of nutmeats, and a smaller proportion of small, crushed fragments of nutmeats which are unattractive and of greatly reduced commercial value.

The difficulties of cracking black walnuts to produce large fragments of nutmeats are well known. The shells are very thick, hard and brittle, and the nutmeats fit very snugly therein in rather complicated convolutions. It is therefore impossible in any commercially feasible manner to remove the nutmeats whole, since cracking the shell even in the most careful manner also breaks the nutmeat. Moreover, due to the convoluted shape of the nutmeat, the first breaking of the shell will free only a portion of said nutmeat, and will produce some larger shell fragments which still contain portions of the nutmeat immovably fixed therein. These larger shell fragments must therefore be cracked again, which frees additional portions of the nutmeat, but may also leave shell fragments still containing nutmeat. These latter fragments must be cracked again, and so on until the nutmeat is completely extracted or until the remaining fragments thereof still encased in shell fragments are so small as to render their removal commercially unprofitable. The removal of these final fragments of nutmeat is sometimes performed in a hand operation. It will be readily apparent that this process tends to produce nutmeats containing a large proportion of very small, "mealy" fragments which are quite unattractive and which have a greatly reduced commercial value.

The present invention takes advantage of the fact that a greater proportion of larger, commercially valuable nutmeat fragments will be produced if cracking pressure is applied to the whole nut, or to fragments thereof, in certain directions. For example, a black walnut usually has the shape of a slightly flattened ovoid, having major and minor dimensions in a plane transverse to its axis, and larger nutmeat fragments will be produced if it is cracked by pressure across the major axis. Likewise, in re-cracking a half nut, larger nutmeat fragments will be produced if it is cracked by pressure across the relatively flat broken surface thereof, rather than by pressure between the flat surface and the opposite convex surface. The same principle applies generally when re-cracking still smaller fragments of the shell. This concept has been thoroughly tested and found to be quite valid, and to produce a marked increase of larger nutmeat fragments and a corresponding decrease in the very small, mealy fragments.

This object of the present invention is accomplished by means of a cracking unit wherein the nuts are passed through a circular orifice formed conjointly by grooves in the peripheries of a plurality of power driven rotating wheels. Said cracking units are supplied in a series in which the orifices are successively reduced in diameter. As each nut, or fragment thereof, comes to the unit through the orifice of which it is too small to pass, it will of course be cracked. The circular shape of the orifice provides that said wheels will automatically engage the nut or fragment across its major dimension, while the sides thereof corresponding to its minor dimension will not be engaged by the wheels at all.

It is also important that the nut be cracked by a straight compressive force exerted by opposing in-line forces on opposite sides thereof, rather than by out-of-line opposite forces, since in the latter case the nut is broken with a shearing force rather than a straight compressive load, and this also tends to break the nutmeats into smaller pieces. If the circular orifice is formed by semi-circular grooves in only two wheels, a nut may lodge therein engaged by the groove surfaces at laterally opposite sides of the respective wheels, and if it is not free to "roll" about the axis of the orifice to adjust its major axis to alignment with these points of engagement, as it usually is not due to surface roughness and irregularities of form, it will be broken with the shearing force described. Thus another object of this invention is the use of at least four wheels, the circular orifice being formed by arcuate grooves of less than semi-circular extent in their peripheries. As will appear, this reduces the maximum possible lateral offset of opposing forces applied to a nut, and hence reduces the described shearing action.

Other objects are simplicity and economy of construction, efficiency and dependability of operation, and adaptability for use in a continuous, substantially automatic process.

Figure 2:
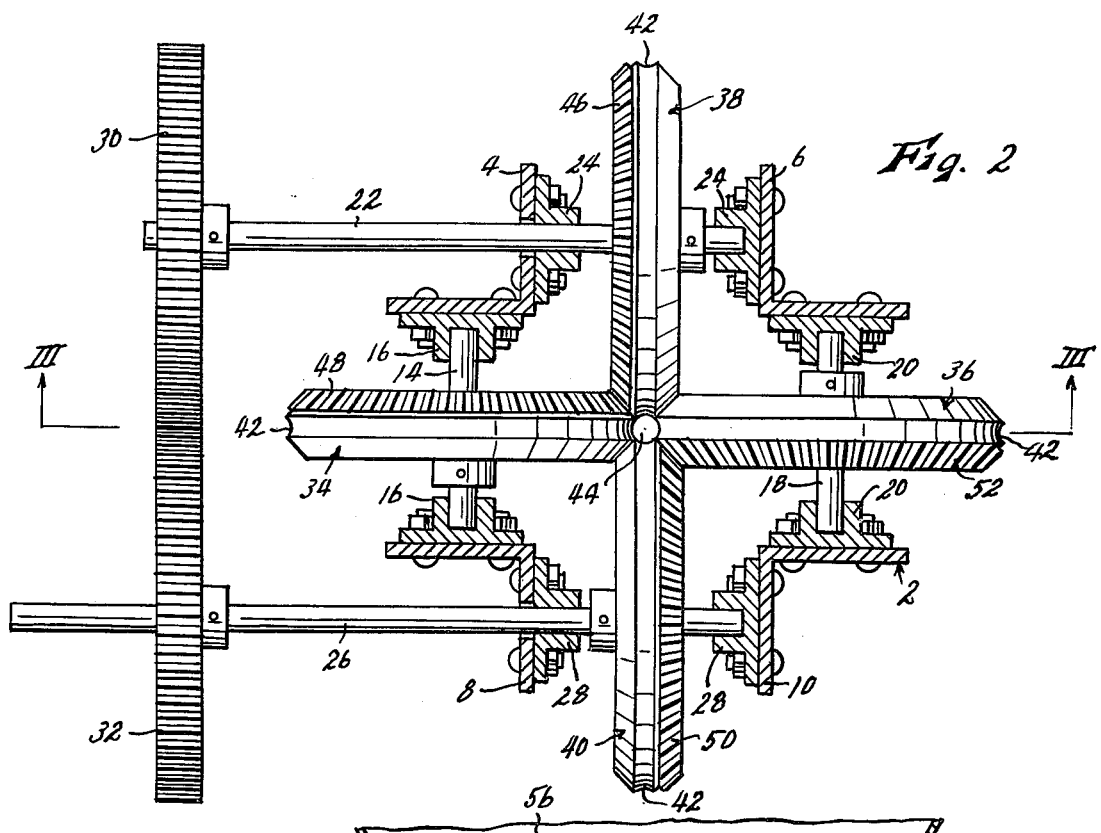
Figure 3:
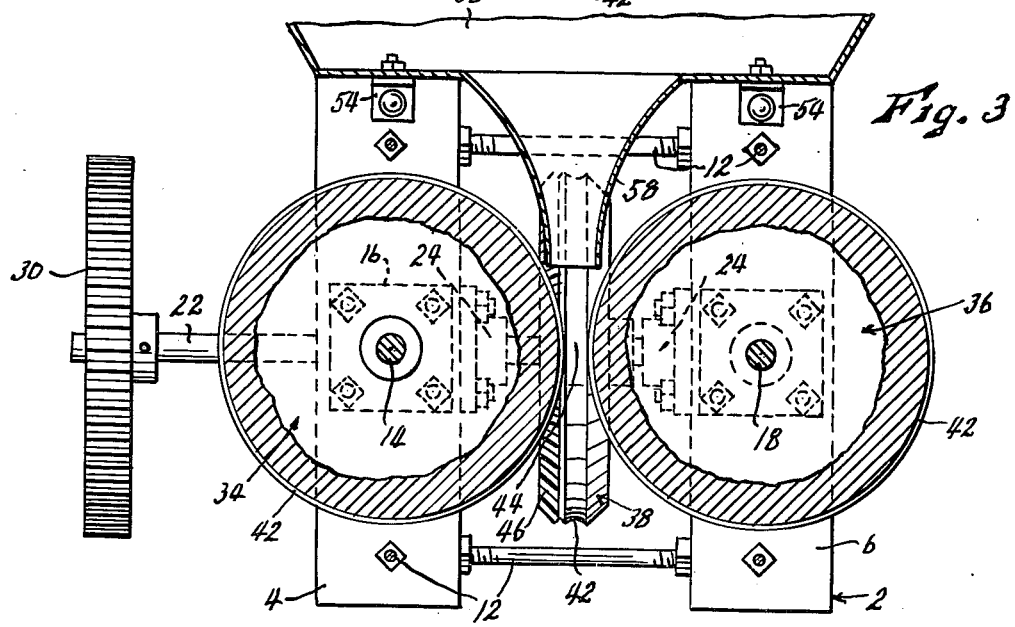

With these objects in view, as well as other objects which will appear in the course of the specification, reference will be had to the drawing, wherein FIG. 1 is a side elevational view of a nut cracking machine embodying the present invention, FIG. 2 is a sectional view taken on line II—II of FIG. 1, with parts left elevation, and FIG. 3 is a fragmentary sectional view taken on line III—III of FIG. 2, with parts left in elevation and partially broken away.

Like reference numerals apply to similar parts throughout the several views, and the numeral 2 applies generally to a frame comprising four heavy angle irons 4, 6, 8 and 10 arranged in parallel, vertical relation at the four corners of a square, said angle irons being rigidly connected together by a series of tie rods 12. A shaft 14 extends horizontally between angle irons 4 and 8, being journalled in bearings 16 affixed to said angle irons. A shaft 18 extends horizontally between angle irons 6 and 10 and is journalled in bearings 20 affixed to said angle irons. A shaft 22 extends horizontally between angle irons 4 and 6, and is journalled in bearings 24 affixed to said angle irons. A shaft 26 extends horizontally between angle irons 8 and 10, and is journalled in bearings 28 affixed to said angle irons. Shafts 14, 18, 22 and 26 all lie in the same horizontal plane, and define the four sides of a square. Shafts 22 and 26 extend outwardly from frame 2, and a gear 20 affixed on the extended portion of shaft 22 is meshed with a gear 32 of equal size affixed on shaft 26. Shaft 26 is extended outwardly from gear 32, and may be connected to any suitable source of power, not shown, whereby it is rotated. By virtue of gears 30 and 32, shaft 22 is rotated at an equal speed, but in the opposite direction.

Affixed respectively on shafts 14, 18, 22 and 26, within frame 2, are wheels 34, 36, 38 and 40. As best shown in FIG. 2, said wheels are all of equal diameter, and the peripheries thereof come together at the center of the frame. Formed in the edge of each of said wheels is a peripheral groove 42, said groove being arcuate in cross-sectional contour and having a ninety degree angular extent. The grooves 42 of all of said wheels, in conjunction, form a circular orifice 44 between the wheels where they come together, also as best shown in FIG. 2. The edges of each wheel are bevelled to prevent interference between the wheels adjacent orifice 44. One bevelled edge of wheel 38 is toothed to form a bevel gear 46 meshing with a bevel gear 48 similarly formed on wheel 34, and a bevel gear 50 formed on wheel 40 is meshed with a bevel gear 52 formed on wheel 36. Thus when shaft 26 is turned by an external power source, as previously described, all of wheels 34, 36, 38 and 40 will be rotated, and in such direction that the portions of all their peripheries defining orifice 44 will move downwardly at equal speeds.

Affixed to the upper end of frame 2, as by brackets 54 (see FIG. 3), is a hopper 56 for containing nuts or fragments of nuts to be cracked. Said hopper is provided at its bottom with a generally conical discharge spout 58 extending downwardly in substantially coaxial relation to orifice 44. The minimum internal diameter of said spout, at its lower end, must be somewhat larger than the diameter of said orifice.

In use, nuts to be cracked, and/or nut fragments to be re-cracked, are received in hopper 56, and feed by gravity through spout 58 and thence into the tapered passageway defined by the portions of grooves 42 just above orifice 44, it being understood that wheels 34, 36, 38 and 40 have been set in rotation as previously described. Each nut or nut fragment having a maximum dimension greater than the diameter of orifice 44 will be gripped between the wheels and forced through said orifice, whereby it will be cracked or broken. Each such nut or fragment will obviously be cracked by pressure across its maximum or major dimension, since due to the circular shape of the orifice, the nut can be engaged by only one pair of opposite wheels, that is either by wheels 34 and 36, or by wheels 38 and 40, while the other set of opposite wheels, which are aligned with a minor dimension of the nut, cannot engage said nut at all. As previously discussed, this mode of cracking has been found to produce a much larger percentage of nutmeat fragments of attractively and acceptably larger size, and a much smaller percentage of very small, mealy fragments. My device thus represents a substantial improvement over conventional machines in which the nuts are cracked and re-cracked between sets of straight, parallel rollers, since in the latter type of machine the roller pressure tends to turn or arrange the nuts so that they are cracked by pressure across their minimum dimensions.

While a circular orifice 44 could be formed by only two wheels, such as wheels 38 and 40, if the peripheral grooves 42 thereof were semi-circular in cross-sectional form, the use of four wheels has been found more effective in producing a larger proportion of larger nutmeat fragments. This is a result of the fact that with only two wheels, the major axis of a nut might engage the two grooves at or nearly at the laterally opposite sides of the wheels. The nut would still be broken by a direct compression along its major axis if the nut were free to roll or turn about the axis of orifice 44, but it often cannot roll in this manner due to its surface roughness, or to slight irregularities in its form. Therefore nuts so engaging laterally opposite sides of the grooves are broken by a shearing force, the pressure applied by the two wheels being exerted along parallel but laterally offset lines. This shearing effect has been found to tend to break up the nutmeats into smaller pieces. The use of four wheels effectively reduces the width of grooves 42, relative to a nut being broken, from a figure virtually equal to the diameter of the nut to a figure only a fraction of the nut diameter. This reduces the maximum lateral offset of the force couple which results in the shearing action, making said forces more nearly directly opposed so that the breakage produces larger nutmeat fragments.

In other words, while the use of two wheels, each having a semi-circular peripheral groove, to form a circular breaking orifice, produces some improvements over present machines in producing a greater proportion of larger nutmeats, the use of four wheels, each with a groove of 90° angular extent, produces a substantial further improvement. The use of a still greater number of wheels, with peripheral grooves of correspondingly lesser angular extent, would produce still further improvement, but in progressively smaller degrees.

It is important that the wheels be of sufficiently large diameter that the conically tapered entry to orifice 44 formed by the portions of the wheel grooves 42 just above the orifice have a sufficiently small included angle that the nuts will not simply slide on and be supported by the wheels without being passed through the orifice, but will be gripped firmly between the wheels and be drawn positively thereby downwardly through the orifice. The proportions shown have been found to be generally satisfactory, although the wheel diameters could be altered if found to be necessary or desirable. The wheel surfaces within grooves 42 could also be slightly roughened for this purpose, to provide better traction on the nuts. It is important also that the orifice be provided with smooth, unbroken walls, that is, that the wheels not be spaced apart adjacent the orifice, and that the grooves 42 have generally smooth, uninterrupted surfaces rather than being of skeleton form, such as by being formed of spaced apart bars or rods. Any such spacing would provide recesses or pockets into which the parts of the nut or nut fragment corresponding to its major dimension could be received without cracking pressure being applied thereto, with the result that cracking could occur by pressure across a minor dimension. It will be seen that the gear teeth of each wheel are spaced part from the groove 42 of the wheel. This minimizes the entry of nutmeat and shell particles between said teeth, which would grind the shell and possibly foul the machine with a gum consisting of the ground shell and nut oil.

In actual commercial installations, a series of cracking units such as the one illustrated would be employed, the diameters of orifices 44 in said series being reduced in graduated steps. The first unit would perform the initial cracking of only the largest nuts, and pass the smaller nuts. Any nutmeats freed from the shell by this first unit, together with any very small shell fragments produced, would then be screened out, and all larger fragments requiring re-cracking, together with the uncracked whole nuts, would be passed to the next unit, which would crack the next smaller whole nuts, and re-crack some of the largest fragments from the first unit. The process would then be repeated in each successively smaller unit, until the final unit would reduce all the shell fragments to the smallest commercially feasible size. However, the screening, conveying and multiple-step features of this process are generally conventional, and are not here shown.

It is considered that the inventive concepts involved are fully embodied in the single cracking unit as illustrated.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is

1. A nut cracking machine comprising a frame, cracking means consisting of a plurality of wheels carried rotatably by said frame, the axes of said wheels forming a closed polygon lying in a horizontal plane, each of said wheels contacting the next adjacent wheels centrally of said polygon, and there being a groove of arcuate cross-sectional contour formed peripherally in each of said wheels, said grooves of all of said wheels conjointly forming a circular orifice having a vertical axis at the juncture of said wheels, there being at least four of said wheels, in which case the axes of said wheels form a square, and the groove in the periphery of each of said wheels is on 90° angular extend in cross-sectional contour, gravity means operable to feed nuts and nut fragments to be cracked downwardly between said wheels to said orifice, said nuts and fragments being of non-circular cross-sectional and having a major dimension greater than the diameter of said orifice, and power means operable to rotate all of said wheels at equal speeds in such directions that the portions of their peripheries defining said orifice at any given moment downwardly with respect to said orifice, whereby said nuts and fragments are drawn through said orifice and cracked by pressure across the major dimensions thereof.

* * * * *